United States Patent [19]

Tanaka

[11] Patent Number: 5,207,520
[45] Date of Patent: May 4, 1993

[54] PRINTER CARRIAGE ACCELERATION CONTROL DEVICE

[75] Inventor: Hirotomo Tanaka, Suwa, Japan

[73] Assignee: Seiko Epson Corp., Tokyo, Japan

[21] Appl. No.: 689,906

[22] PCT Filed: Oct. 3, 1990

[86] PCT No.: PCT/JP90/01275
§ 371 Date: Jul. 19, 1991
§ 102(e) Date: Jul. 19, 1991

[87] PCT Pub. No.: WO91/04866
PCT Pub. Date: Apr. 18, 1991

[30] Foreign Application Priority Data

Oct. 3, 1989 [JP] Japan ............................ 1-258208
Jan. 23, 1990 [JP] Japan ............................ 2-13241
Apr. 5, 1990 [JP] Japan ............................ 2-90726
Apr. 11, 1990 [JP] Japan ............................ 2-96017

[51] Int. Cl.$^5$ .................................................. B41J 19/30
[52] U.S. Cl. ..................................... 400/279; 400/322; 400/903; 318/276; 388/804
[58] Field of Search ............ 400/279, 320, 322, 583.4, 400/903; 318/434, 605, 61, 64, 270, 271, 276, 439; 388/19, 804, 811, 819, 822, 903, 915, 916

[56] References Cited

U.S. PATENT DOCUMENTS 4,445,075 4/1989 Fry ........................................ 318/434
4,959,808 9/1990 Neuffer ................................. 318/61

FOREIGN PATENT DOCUMENTS

56-36678 8/1981 Japan ................................. 318/434
61-56715 3/1986 Japan ................................. 318/434
106094 5/1986 Japan ................................. 318/434
106094 5/1986 Japan ................................. 318/434
63-148894 6/1988 Japan ................................. 318/434
63-242187 10/1988 Japan ............................... 318/605
1-136572 5/1989 Japan ................................. 318/599
1-222681 9/1989 Japan ................................. 318/599

*Primary Examiner*—David A. Wiecking
*Assistant Examiner*—Steven S. Kelley
*Attorney, Agent, or Firm*—Ladas & Parry

[57] ABSTRACT

A device for PWM control of the printer carriage motor (1) which has a circuit (65) for generating a first PWM pulses of 100% duty ratio, a circuit for computing second PWM pulses (31, 37, 39, 15, 17, 53, 57, 59) according to the PI control method based on the difference between the motor current speed and the predetermined standard speed, and a circuit (121) for holding the optimum integrated value for controlling the motor current speed agree with the standard speed. Until the motor current speed reaches a predetermined transfer speed slightly lower than the standard speed, the carriage motor is accelerated with the maximum acceleration according to the first PWM pulses, when the transfer speed is reached, the optimum integrated value is set as the initial integrated value of the PI control, and thereafter the speed control is carried out according to the PI control method. In this PWM control, the current supplied to the carriage motor is controlled so as not to exceed a current limiting value predetermined according to the standard speed. Furthermore, the PWM standard period is purposely varied.

6 Claims, 8 Drawing Sheets

PRINTER CARRIAGE ACCELERATION CONTROL DEVICE

TECHNICAL FIELD

This invention relates to the control device of a printer carriage driving DC motor of the type that performs printing on recording media by driving the carriage with the DC motor as in the case of a serial printer.

BACKGROUND ART

Figure 1:
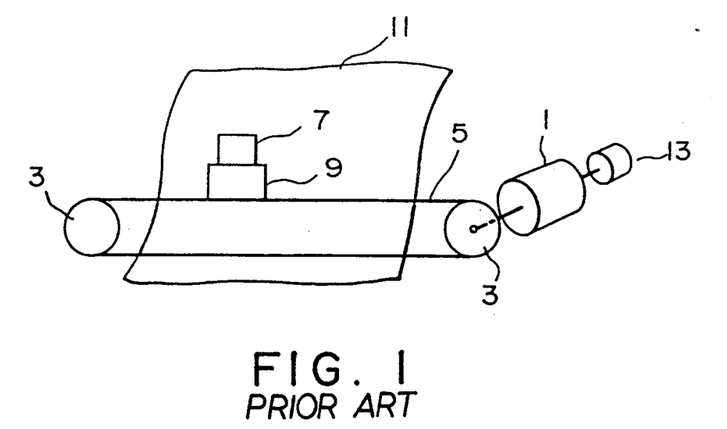
FIG. 1 is a schematic illustration of the carriage driving mechanism of an ordinary serial printer.

FIG. 1 shows the carriage driving mechanism of a general serial printer The revolutions of the DC motor 1 called a carriage motor is converted into a linear motion of the timing belt 5 via the pulley 3. While by driving with the timing belt 5, the carriage 9 mounted with a printing head 7 is moved, printing is carried out with the printing head 7 on the recording media such as paper.

Figure 2:
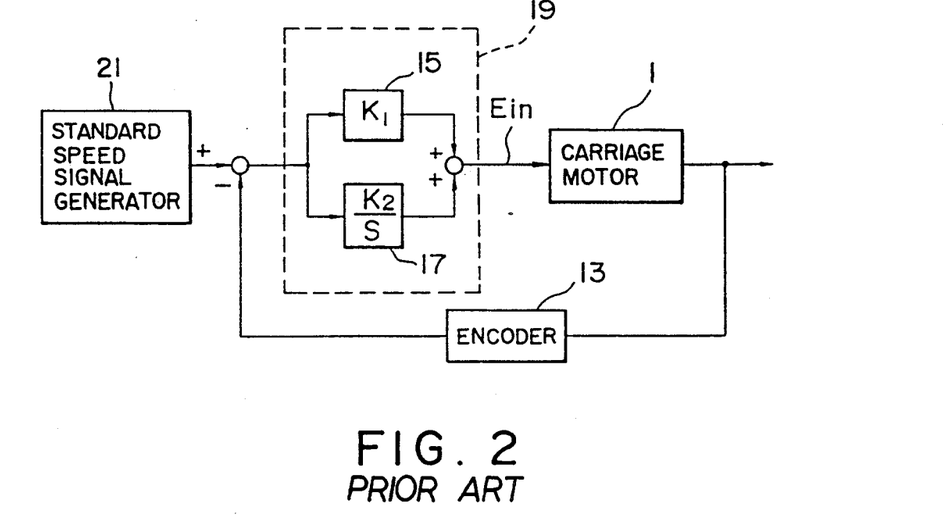
FIG. 2 is a block diagram showing the conventional carriage control.

Hitherto, to control the revolution speed of the carriage motor 1, PI control shown on FIG. 2 has been generally used. This control employs a compensator 19 where the proportion element 15 having a gain K1 and the integration element 17 having a gain K2 are combined in parallel. On receipt of the difference between the revolution speed of the DC motor 1 as detected by the rotary encoder 13 and the standard speed generated from the standard speed signal generator 21, the compensator 19 controls the output of the motor 1 so as to bring its revolution speed in line with the standard speed.

Figure 3:
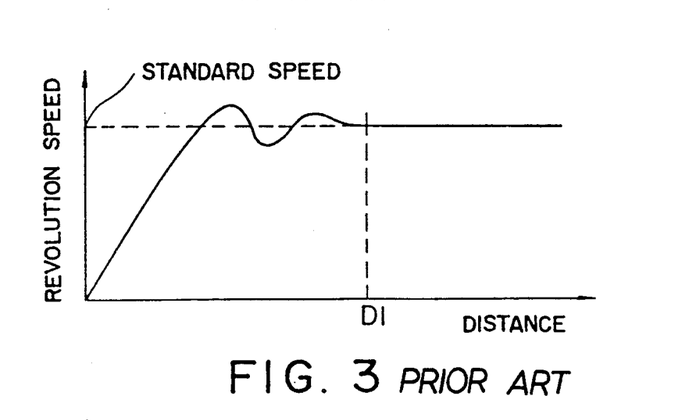
FIG. 3 is a drawing showing the speed variation of the carriage motor by means of the conventional carriage control.

In general, to ensure a good printing quality with the serial printer, the printing is performed as shown in FIG. 3, after the revolution speed of the carriage motor 1 has regulated to the standard speed. In this case, the travel distance D1 required to regulate the revolution speed of the carriage motor 1 to the standard speed is desired to be as small as possible in order to realize a small-sized serial printer. Consequently, the revolution speed of the carriage motor 1 is required to rise to the standard speed in the shortest time possible and yet to be regulated stably with little overshoots or undershoots.

In the conventional control device, however, the stability and response are determined by the characteristic of the control system composed of the compensator, DC motor and speed detector. Furthermore, in general, the stability and response are contradictory to each other, and consequently, for example, giving priority to the stability worsens the response, thus there is a limitation in satisfying the foregoing requirements.

Figure 4:
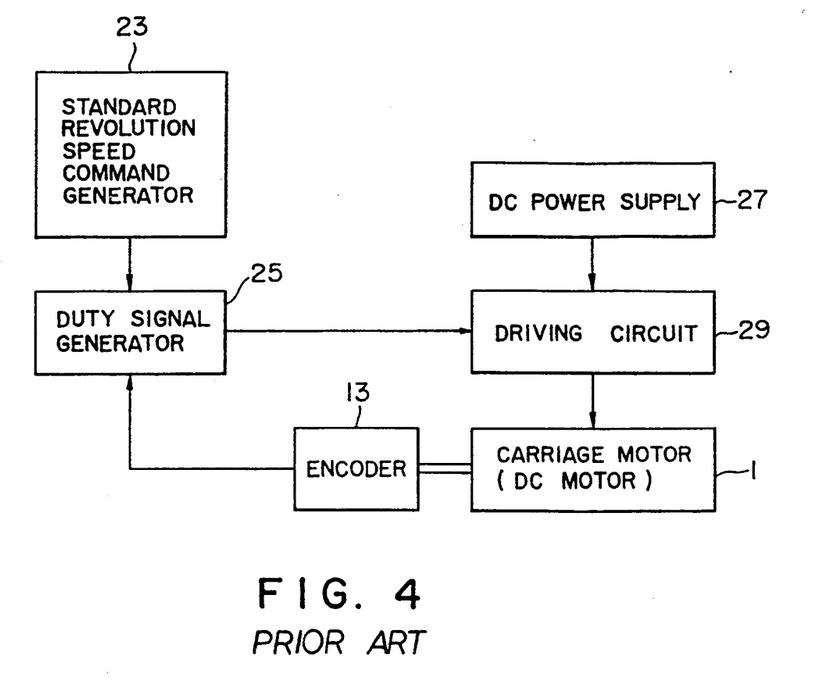
FIG. 4 is a block diagram showing the PWM control of the conventional carriage motor.
Figure 5:
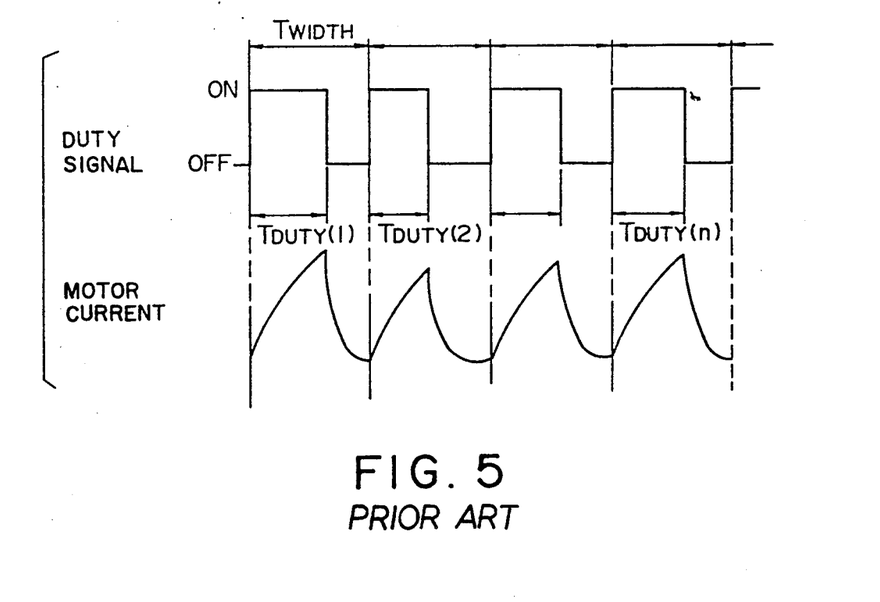
FIG. 5 is a drawing showing the duty signal and carriage motor current waveform in the conventional PWM control.

Furthermore, to yield a good printing quality and a smooth carriage run, it is necessary to control the carriage motor to the standard revolution speed with a high precision. In the conventional serial printer, the revolution speed of the carriage motor (DC motor) is controlled by driving it with a pulse-shaped driving voltage, and the PWM (Pulse Width Modulation) control is employed as a typical method. FIG. 4 is a block diagram showing the conventional control. The unit 23 outputs the standard revolution speed signal and the unit 25 generates a duty signal having the duty corresponding to the standard revolution speed. By performing ON/OFF in response to the duty signal, the driving circuit 29 converts the voltage from the DC power source 27 into a pulse-shaped driving voltage for supply to the carriage motor 1. The unit 25, as shown in FIG. 5(A), determines for each PWM standard period $T_{WIDTH}$, the value of duty $T_{DUTY[n]}$ in each period, and outputs the duty signal. The value of the duty $T_{DUTY[n]}$ is generally determined according to the difference between the revolution speed which is detected by the rotary encoder fitted to the shaft of the carriage motor 1 and the standard revolution speed.

Figure 6:
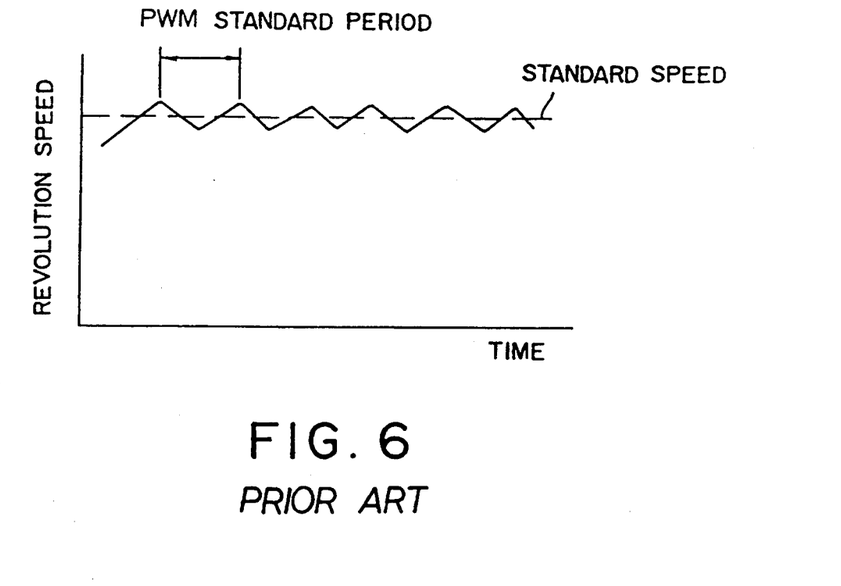
FIG. 6 is a drawing showing the variation of the carriage motor revolution speed in the conventional PWM control.

For simplicity of the control process and so forth, in general, the value of the PWM standard period $T_{WIDTH}$ is constant. On the other hand, to make the revolution speed agree with the predetermined standard revolution speed, the duty $T_{DUTY[n]}$ varies. When the duty $T_{DUTY[n]}$ varies as in FIG. 5, the current shown in FIG. 5 flows in the carriage motor 1. Since the torque produced by the DC motor is proportional to the magnitude of the current, such a variation of current causes a periodic pulsation of torque. Consequently, the revolution speed agrees with the standard revolution speed on an average. In actual cases, however, as shown in FIG. 6, it varies over and below the standard revolution speed while generating a minute oscillation of the period identical to the PWM standard period. The majority of serial printers have plural speed modes according to the printing density With increase of the printing density, the standard rotation speed becomes lower. In general, the lower the standard revolution speed, the smaller the torque demanded of the carriage motor 1, i.e., the value of the current flowing in the carriage motor 1. However, at a smaller standard revolution speed (though the duty $T_{DUTY}$ becomes small), the counter cmf of the carriage motor 1 is small, and as a result the current peak value is liable to become large, magnifying the periodic pulsation of the torque. When the standard revolution speed is small as above, despite the small torque as required, a torque more than necessary is produced because of the large current peak value. Such a larger torque than necessary is desired to be eliminated.

Figure 7:
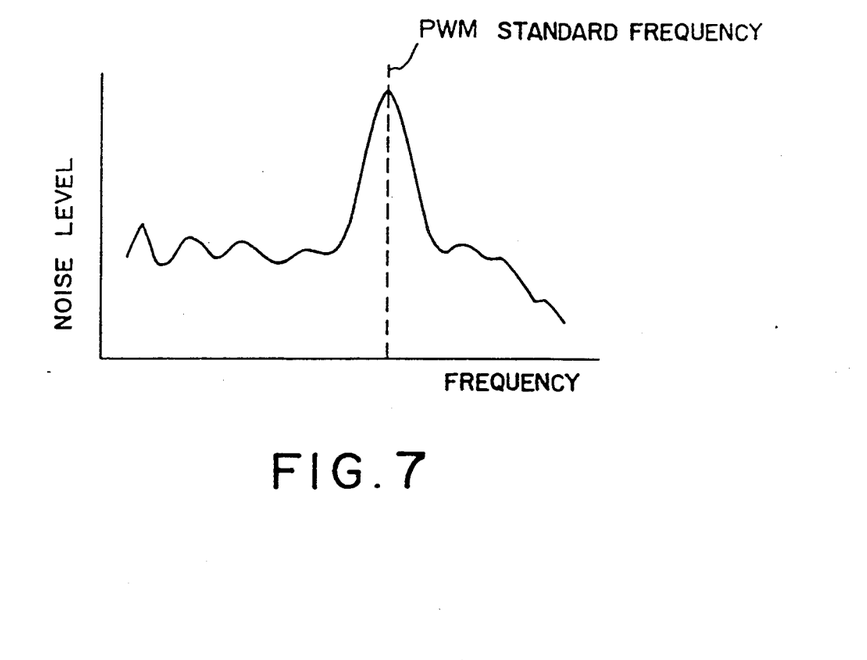
FIG. 7 is a drawing showing a frequency characteristic of the noise caused by the speed variation of the carriage motor.

The periodic minute oscillation due to the variation of torque of the carriage motor 1 generates a noise. In a frequency analysis of this noise a large noise peak appears at the PWM standard frequency $f_{WIDTH}$ ($=1/T_{WIDTH}$) as shown in FIG. 7. Since the value of the PWM standard frequency $f_{WIDTH}$ falls in the frequency band of several kHz to several ten kHz, this noise is undesirable on the hearing sense.

DISCLOSURE OF THE INVENTION

The purpose of this invention is to raise the carriage motor revolution speed quickly up to the standard speed, and to regulate the speed stably with little overshoots and undershoots, thus realizing a further miniaturization of the printer A further object of this invention is to restrict the torque generated according to the speed modes so that the PWM-controlled carriage motor does not develop a torque more than necessary.

Still a further object of the invention is to reduce the noise caused by the PWM control of the carriage motor, thus realizing a printer of a further low noise.

This invention provides a control device of the printer carriage motor revolution speed which comprises:

means for detecting a revolution speed of the carriage motor;

means for generating a standard speed;

means for integrating the difference between the detected revolution speed and the standard speed;

means responsive to an output value of the integration means for generating a first control signal for controlling the revolution speed to lessen the difference;

means for holding, as an optimum integration value, an output value of the integration means at the time when the revolution speed is regulated to the standard speed;

means for generating a second control signal having a predetermined value;

means for selecting either one of the first and the second control signals;

means for controlling the selecting means during an accelerating time of the carriage motor so that the second control signal is selected until the detected revolution speed reaches a predetermined transfer speed, and the first control speed is selected after the transfer speed has been reached;

means for loading the held optimum integration value into the integration means so that the output value of the integration means at the time when the detected revolution speed has reached the transfer speed during the carriage motor accelerating time agrees with the held optimum integration value; and means for driving the carriage control motor according either one of the first and second control signals selected by the selecting means.

According to this device, the carriage motor is accelerated, during the interval from its start to the time when the predetermined transfer speed is reached, according to the secondary control signal having the predetermined value. This secondary control signal is desired to have a value that permits acceleration of the carriage motor at a maximum acceleration speed. On reaching the transfer speed, the speed control is performed according to the primary control signal based on the difference between the standard speed and current speed. Since in this control the optimum integration value to make the current speed agree with the standard value is set in the integration means as the initial value, overshoots or undershoots can be suppressed to a small value. Furthermore, the optimum integration value is measured in this embodiment by carrying out a trial run at the time of switching the power ON or the time of transferring the speed mode. However, it is also possible to predetermine the optimum integration value in the stage of the printer production and store the value in a non-volatile memory.

Furthermore as a device to PWM-control the supply current to the carriage motor so that the revolution speed of the printer carriage is brought close to the standard speed, this invention provides a control device comprising:

means of detecting the amount of supply current to the carriage motor; and means of limiting the current to be supplied to the motor so that the amount of the detected supply current does not exceed the current limiting value.

With this control device, the motor current can be suppressed below the predetermined current limiting value with reference to the standard speed. By setting the current limiting value appropriately according to the speed standard, the occurrence of larger torque than necessary can be prevented.

Furthermore, as a device to PWM-control the supply current to the carriage motor so as to bring the carriage motor revolution speed close to the standard speed this invention provides a carriage control device comprising:

means generating a fixed fundamental period;

means creating a varying period by applying successively variables to the fundamental period; and means performing PWM control of the supply current by using the varying period as the PWM standard period.

Since in this device the PWM standard period varies, the frequency characteristic of the noise caused by the PWM control takes a form distributed over the variation range of the PWM standard frequency without the appearance of a marked peak in a fixed frequency.

BEST MODES FOR CARRYING OUT THE INVENTION

Figure 8:
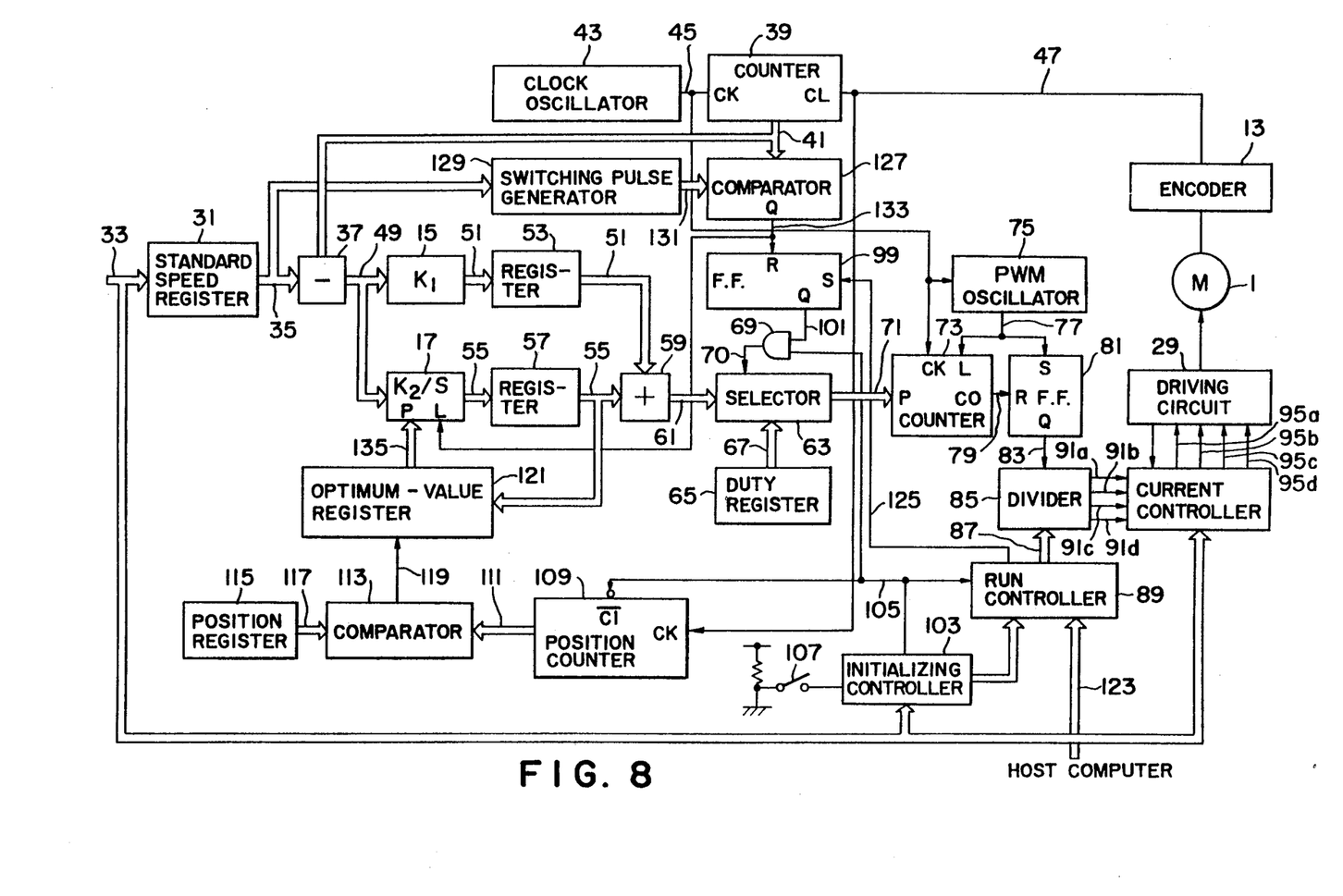
FIG. 8 is a block diagram showing the whole configuration of an embodiment of this invention.

In FIG. 8, which shows a whole configuration of the adequate embodiment of the carriage control device according to this invention, the standard speed register 31 holds a plurality of standard speeds corresponding to each of a plurality of speed modes and outputs the corresponding standard speed 35 on receipt of a speed mode selecting data 33. The standard speed 35 is applied to one of the input terminals of the subtracter 37. To the other input terminal of the subtracter 37 the output data 41 of the counter 39 is applied. This counter 39 receives clock pulses 45 of a predetermined frequency at its clock terminals CK from the clock oscillator 43, and a pulse signal 47 having a frequency corresponding to the motor revolution speed at its clear terminals from the rotary encoder 13. The frequency of the clock pulse 45 is sufficiently high as compared with that of the pulse signal 47. The counter 39 counts the number of the clock pulses 45 included in each period of the pulse signals 47 i.e., the current speed of the carriage motor 1, and sends this current speed 41 to the subtracter 37.

In the subtracter 37, the deviation 49 of the current speed 41 from the standard speed 35 is computed. This deviation 49 is sent to the proportional arithmetic unit 15 and integrator 17. The proportional arithmetic operation unit 15 performs a proportional operation of gain K1 for the deviation 49, and stores the operation result 51 in the register 53. The integrator 17 performs an integration operation of gain K2 for the deviation 49, and stores the operation result 55 in the register 57.

The results of proportional and integration operations 51 and 55, which are stored in the registers 53 and 57, are added together by the adder 59. The output data of the adder 59 shows the duty (corresponds to $T_{DUTY}$ in FIG. 5A) computed by the PI control on the basis of the deviation 49.

The thus computed duty 61 is applied to one of the input terminals of the selector 63. To the other input terminal of this selector 63 a predetermined duty stored in the duty register 65 is applied. The predetermined duty means, for example, the value corresponding to the duty ratio of 100%, i.e., a value equal to the PWM standard period (equivalent to the PWM standard period (equivalent to the $T_{WIDTH}$ in FIG. 5A). The selector 63 selects either one of the duty 61 computed according to the logical value of the output signal of the AND gate 69 and the predetermined duty 67 and sends it to the counter 73.

The selected duty 71 is applied to the preset terminal P of the counter 73. To the load terminal L of the counter 73 the PWM standard pulse 77 is applied, which is generated from the PWM oscillator 75 for each PWM standard period. Thus, for each PWM standard period, the count value of the counter 73 is preset to the selected duty 71, and the count-down from the preset duty 71 is carried out in synchronism with the clock pulses 45 from the clock oscillator 43. When the count value as counted down reaches zero, i.e. when the time corresponding to the preset duty 71 elapses, the carry signal 79 is output from the carry-out terminals CO of the counter 73.

By the carry signal 79 from the counter 73, the flip-flop 81 is reset by the PWM standard pulse 77 sent from the PWM oscillator 75. Therefore, the output signal 83 of the flip-flop 81 forms the duty signal 83 having the duty equal to the PWM standard period and the selected duty 71.

Figure 9:
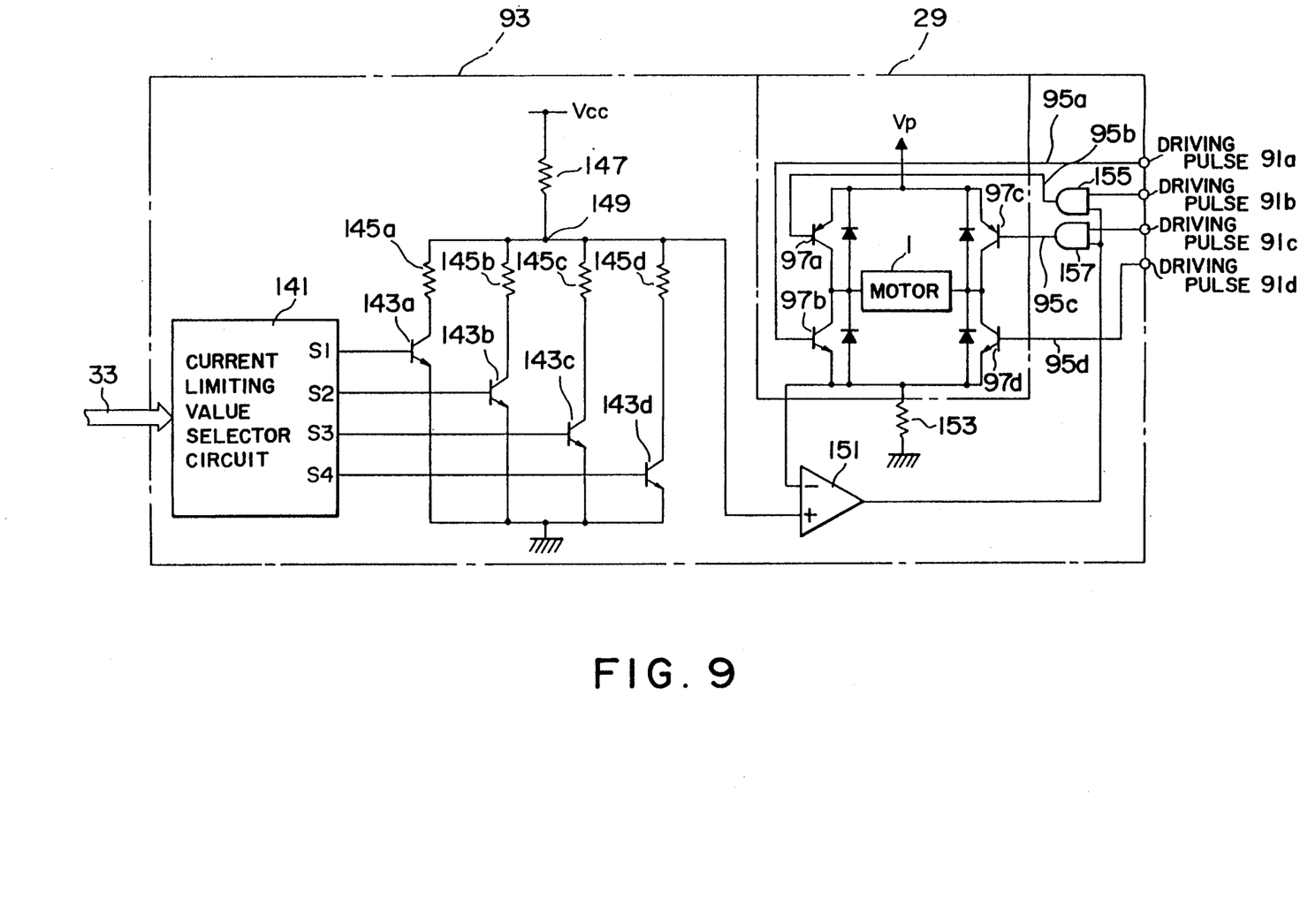
FIG. 9 is a drawing showing the configuration of the current controller and driving circuit in FIG. 8.

The waveform of the duty signal 83 output from the flip-flop 81, like the waveform shown in FIG. 5A, shows a high level during the selected duty 71 alone and a low level during the remaining time within each PWM standard period. The duty signal 83 is applied to the distributor 85. According to the run control data 87 from the run controller 89 that indicates the ON/OFF and direction of revolution of the carriage motor 1, the distributor 85 distributes the duty signal 83 to the first paired pulses 91a, 91d or 2nd paired pulses 91b, 91c among the 4 driving pulses 91a-91d. These driving pulses 91a-91d are sent to the current controller 93, where they are corrected according to the speed mode. The corrected driving pulses 95a-95d are applied to the driving circuit 29. The driving circuit 29, as shown in FIG. 9, includes the paired switching transistors 97a, 97d which control the current for the positive revolution of the carriage motor 1 and the paired switching transistors 97b, 97c which control the current for the reverse revolution of the carriage motor 1. On receipt of the respectively corrected driving pulses 95a, 95d, 95b, 95c, the switching transistors 97a, 97d, 97b, 97c control the amount of current supplied to the motor 1, thereby controlling the revolution speed of the carriage motor 1. As already stated, the selector 63 selects either one of the duty 61 computed by the PI control method or the duty 67 of a fixed value. Whichever is to be selected is determined by the value of the output signal 70 of the AND gate 69. To the AND gate 69, the output signal 101 is applied from the flip-flop 99 and the control signal 105 from the initializing controller 103. When the power switch 107 of the printer is turned ON, or when the speed mode transfer is made by the speed mode select data 33, the initializing controller 103 turns the control signal to the low level and also make the carriage run in the predetermined direction for the predetermined interval (for example, the direction of normal revolution of motor 1) by instructing the travel controller 89. The run at this time is called a trial run in this specification. In the trial run, the output signal 70 of the AND gate 69 is at the low level, and at this time, the selector 63 selects the PI control duty 61. That is, in this trial run, the speed of the carriage motor 1 is controlled by the PI control in a feedback mode of operation.

Furthermore, in the trial run the position counter 109 counts the position pulse 47 coming from the encoder 13 and detects the current position 111 of the carriage. The detected current position 111 of the carriage is input to the comparator 113, where it is compared with the predetermined position 117 from the position register 115. As the predetermined position 117, the position where the motor speed in the trial run has reached and has been regulated securely to the standard speed is selected. When the current carriage position 111 reaches this predetermined position 117, a high level signal 119 is applied from the comparator 113 to the strobe terminal ST of the optimum-value register 121. Then the optimum value register 121 accepts the integrated value 55 from the integration circuit 17, and holds it thereafter. The integrated value held in the optimum value register 121 is called the optimal integrated value hereunder. This optimal integrated value is, in short, the integrated value when the control has become stable in the case of the carriage speed control performed by the PI control method.

When the trial run is finished, the initializing controller 103 turns the control signal 105 to high level. In this state, the run controller 89 controls the start, stop and turning direction of the carriage motor 1 according to the instructions 123 from the external host computer. The carriage run at this time is called an actual run hereunder. This actual run means the carriage run when the printing is performed following the directions from the host computer In this actual run, solely the duty selection in the selector 63 is determined by the output signal 101 of the flip-flop 99. The flip-flop 99 is set by the signal 125 sent from the run controller 89 each time when printing of each line is started. Thereby the output signal 70 of the AND gate 69 becomes a high level, and the selector 63 selects the fixed duty (a value equivalent to 100% duty ratio) from the duty register 65, so that the acceleration of the carriage motor 1 will be performed with a maximum acceleration and not under PI control. That is, the acceleration is caused without feedback and independently of motor speed.

When the carriage motor 1 is accelerated with a maximum acceleration, the counter 39 detects the current speed, and the detected current speed 41 is sent to the comparator 127 for comparison with the transfer speed 131 sent from the transfer speed generator 129. As the transfer speed 131 is selected an appropriate value slightly lower than the standard speed 35. When the current speed 41 reaches the transfer speed 131, the flip-flop 99 is reset by the output signal 133 of the comparator 127. Thereby the output signal 70 of the AND gate 69 is switched to a low level, and the selector 63 will select the duty 61 that follows the PI control. At the same time, the output signal 133 from the comparator 127 is applied to the load terminal L of the integrator, and the optimum integrated value 135 is loaded from the optimal register 121 onto the integrator 17 as the initial integrated value. Thereafter the speed control of the carriage motor 1 will be made according to the PI control.

Figure 10A:
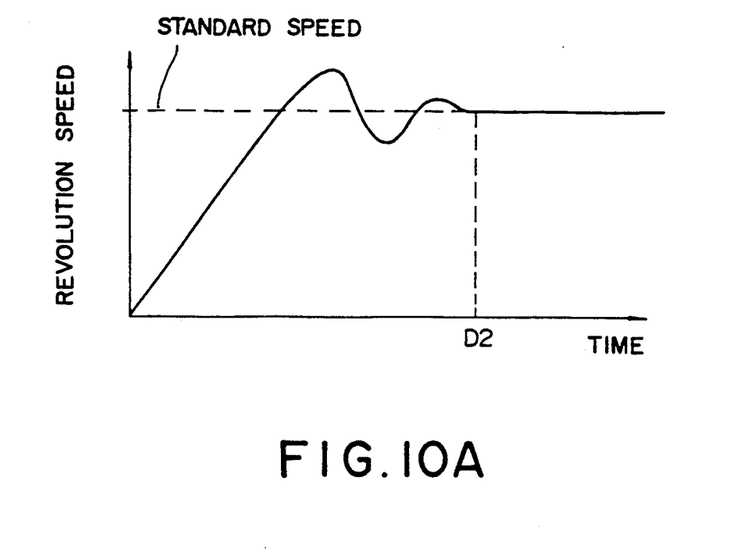
FIG. 10A is a drawing showing the condition of acceleration in the trial run.
Figure 10B:
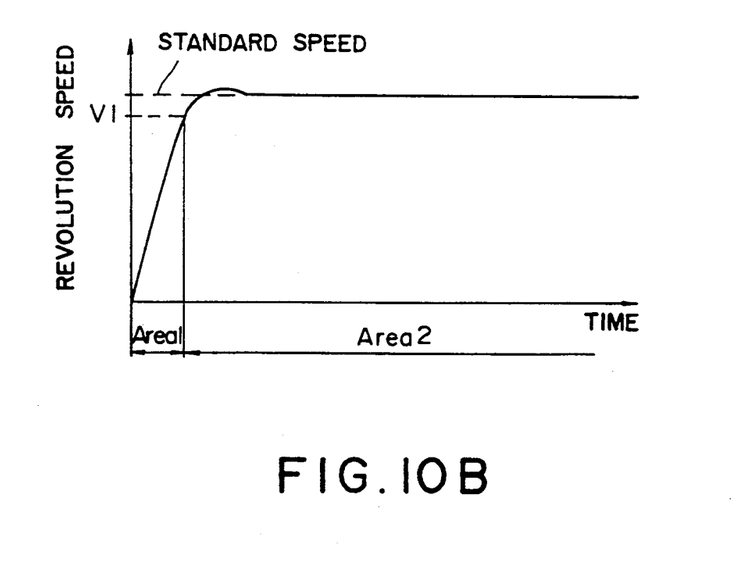
FIG. 10B is a drawing showing the condition of acceleration in the actual run.

The acceleration condition of the carriage motor 1 in the trial run in this embodiment is shown in FIG. 10A, and the acceleration conditions of the same in the actual run is shown in FIG. 10B.

Referring to FIG. 10A, the speed of the carriage motor 1 in the trial run is controlled by the same PI control the same as in the former case. In the predetermined position D2, where the revolution speed is regulated to the standard speed, the integrated value in the integrator at this time is stored as the optimum integrated value. Regarding the travel distance required for the trial run, the short distance including that from the start to the predetermined position D2 is sufficient. After completion of the trial run, an actual run accompanied by printing is carried out. Referring to FIG. 10B, the carriage motor is in the actual run, is accelerated at the maximum acceleration in the region (Area 1) until the motor reaches the transfer speed V1 a little lower than the standard speed. In the region (Area 2) after the motor has reached the transfer speed V1, the speed control is made by the PI control taking the optimum integrated value as the initial integrated value. As a result, the motor revolution speed reaches the standard speed in a short time, and further, is regulated stably without overshoots and undershoots, thus contributing to the miniaturization of serial printers.

FIG. 9 shows the configuration of the current controller 93 in FIG. 8.

This current controller 93 includes a current limiting value selector circuit 141 and a plurality of transistors 143a-143d corresponding respectively to each speed mode that is selectively turned ON according to the results of the decoding. Each of the transistors 143a-143d is connected between the resistors 145a-145d, each having different resistance, and the ground. These resistors 145a-145d are connected to each other at the node 149, and between the node 149 and the power supply $V_{CC}$, a resistor 147 is connected. Therefore, depending on the speed mode as selected, different voltages appear at the node 149. The voltage value at this node 149 means the current limiting value that specifies the maximum limit of the current to flow through the motor 1. This current limiting value is applied to the comparator 151 where it is compared with the current value of the motor 1 as detected with the resistor 153. By the output signal of the comparator 151, the gates 155 and 157 for transmitting the driving pulses 91b and 91c to the driving circuit 29 are ON/OFF controlled.

When the current value of the motor 1 is smaller than the current limiting value, the output signal of the comparator 151 is at a high level, and the gates 155 and 157 open and transmit the driving pulses 91a-91d to the driving circuit 29. Consequently a current is supplied 20 to the motor 1 according to the driving pulses 91a-91d. On the other hand, when the motor current value is about to exceed the current limiting value, the output signal of the comparator 151 becomes a low level, and the gates 155 and 157 close and obstruct the driving pulses 91b and 91c, thereby interrupting the current supply to the motor.

Figure 11:
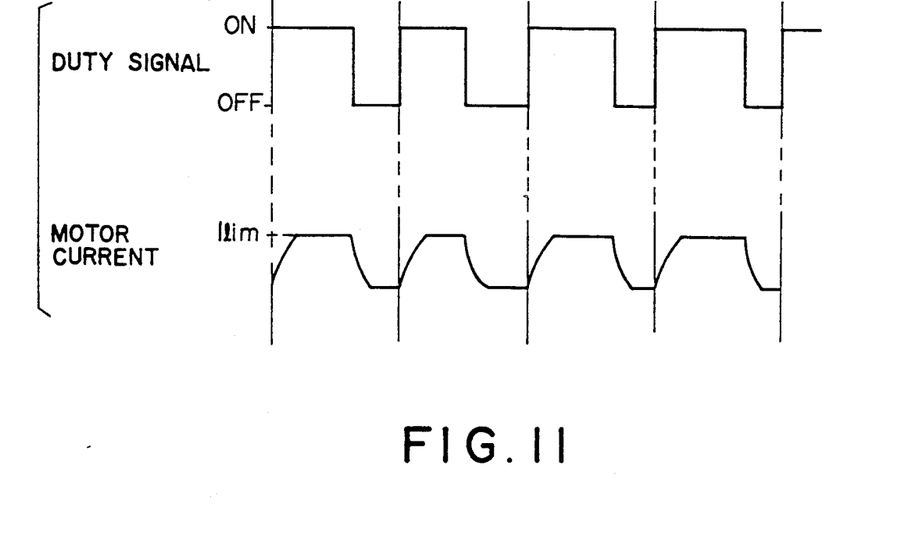
FIG. 11 is a drawing showing the conditions in which the motor current is limited.

As a result, as shown in FIG. 11, the motor current is limited to the current limiting value $I_{lim}$ or less. The current limiting value in each speed mode is determined by the maximum torque required in each speed mode. the example of this current limiting value is shown in TABLE 1.

TABLE 1

| Standard revolutin speed (rpm) | Current limiting value (A) |
| --- | --- |
| 500 | 1 |
| 750 | 1.2 |
| 1000 | 1.5 |
| 1250 | 1.7 |

Further, as shown in TABLE 2, the current limiting value may be changed for each predetermined standard-speed range.

TABLE 2

| Standard revolutin speed (rpm) | Current limiting value (A) |
| --- | --- |
| 500 | 1.2 |
| 750 | 1.2 |
| 1000 | 1.7 |
| 1250 | 1.7 |

Limiting the motor current according to the standard current in this way can prevent occurrence of unnecessary torque, and alleviate the oscillation of the carriage driving mechanism caused by the torque variation.

Figure 12:
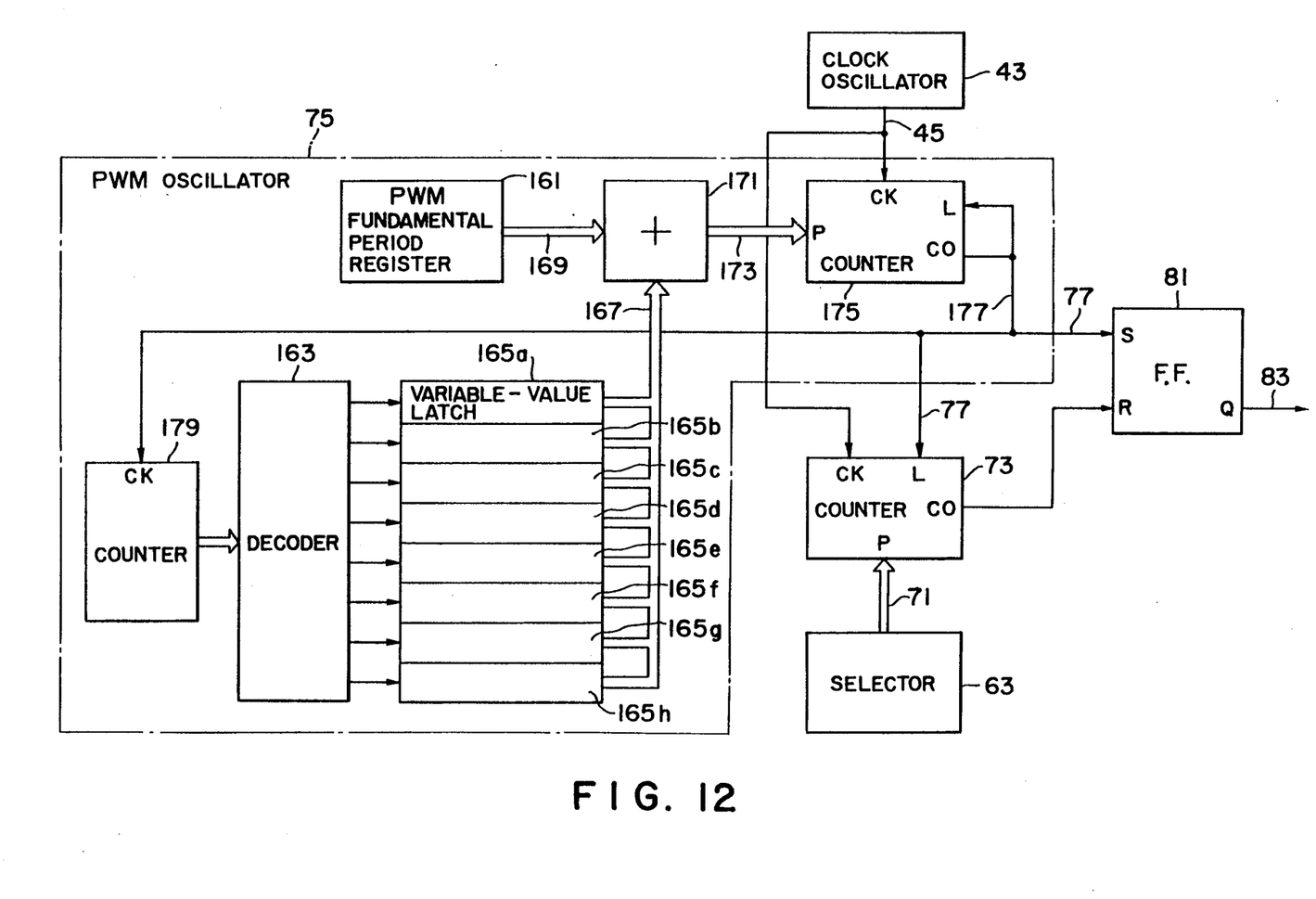
FIG. 12 is a drawing showing the configuration of the PWM oscillator in FIG. 8.

FIG. 12 shows the configuration of the PWM oscillator in FIG. 8 This PWM oscillator 75 contains a register 161 that stores the predetermined value of the PWM fundamental period, and a plurality of variable-value latches 165a-165g that store the values of different periodic variables respectively. One of these variable-value latches 165a-165h is selected by the decoder 163, and from the selected variable-value latch the periodic variable 167 is output. This periodic variable 167 is input to the adder 171 where it is added to the value of the fundamental period 169 from the PWM basic register 161. The result of this addition is applied to the preset terminal P of the counter 175 as a value of the PWM standard period 173, and is loaded on to the counter 175 when this counter 175 outputs a carry signal 177. The counter 175, in synchronism with the clock pulse 45, performs the count-down from the preset PWM standard period value 175. When the count value reaches zero, the carry signal 177 is output, that is, every time when the PWM standard period elapses, the carry signal 177 is output. The carry signal 177 is, as the PWM standard pulse 77, applied to the counter 73 and the flip-flop 81.

The carry signal 177 is further sent also to the clock pulse terminal CK of the counter 179, and varies the count value of the counter 179. Then, the decoder 163 selects another variable-value latch and the value of periodic variable 167 changes to another value. As a result, the PWM standard period is not constant but varies. Therefore, the frequency characteristic of the noise due to the variation of the motor torque in the PWM control does not take a form having a marked peak at a specific frequency, but a form having relative low gentle peaks dispersed over the variation range of the PWM standard period, and therefore its effect on the hearing sense can be alleviated. The foregoing will explain an optimal embodiment of this invention, however, this invention is not to be limited to this embodiment, but includes various deformations within the limits not deviating from its substance.

What is claimed is:

1. A device for controlling the revolution speed of a printer carriage motor, comprising:

means for detecting a revolution speed of said carriage motor;

means for generating a standard speed;

means for integrating a difference between the revolution speed as detected and the standard speed;

means responsive to an output value of said integration means for generating a first control signal for controlling the revolution speed;

means for holding, as an optimum integration value, an output value of said integration means at the time when the revolution speed is regulated to the standard speed;

means for generating a second control signal having a predetermined value independent of motor speed;

means for selecting either one of the first control signal and the second control signal;

means for controlling said selecting means during the accelerating time of said carriage motor, so that the second control signal is selected until the detected revolution speed reaches a predetermined transfer speed less than said standard speed, and that the first control signal is selected after the transfer speed is reached;

means for loading the held optimum integration value into said integration means so that the output value of said integration means the moment when the detected revolution speed has reached the transfer speed during the carriage motor accelerating time agrees with the held optimum integrated value; and means for driving said carriage motor according to one of the first and second control signals selected by said selecting means.

2. A carriage control device as claimed in claim 1, wherein the predetermined transfer speed reached under control of the second control signal is achieved as a result of accelerating said carriage motor at the maximum acceleration obtainable by said motor driving means.

3. A carriage control device having a PWM control unit controlling the current supplied to a printer carriage motor to bring a revolution speed of the printer carriage motor close to a selected standard speed, comprising:

means for generating selectively one of a plurality of standard speeds;

means for generating predetermined current limiting values corresponding to respective ones of the selectively generated standard speeds, the current limiting values corresponding to successive ones of said standard speeds of increasing speed being either of equal or increasing amplitude;

means for detecting the current supplied to said carriage motor; and means for limiting the current supplied to said motor while the motor is being driven at a selected one of said standard speeds so that a detected value of the current does not exceed the generated current limiting value corresponding to said one selected speed.

4. A device for controlling the revolution speed of a printer carriage motor, comprising:

means for detecting revolution speed of a carriage motor and generating a revolution speed signal in response thereto;

means for generating a standard speed signal corresponding to a standard revolution speed;

means for integrating a difference between the revolution speed signal and the standard speed signal;

means, responsive to an output value of said integration means, for generating a first control signal for controlling the revolution speed to correspond to said standard speed;

means for selecting either one of said first control signal and a second control signal;

means for driving said carriage motor according to one of said first and second control signals selected by said selecting means;

means, in response to an initiating signal, for causing said selecting means to select said first control signal for accelerating said motor speed from zero speed to a condition where the motor speed corresponds to said standard speed and is being regulated at said standard speed in response to a first output value of said integration means;

means for detecting said first output value and for storing it as an optimum integration value;

said second control signal being effective, independently of said integration means, for accelerating said motor from zero speed towards said standard speed at a rate more rapid than the acceleration of said motor in response to said first control signal;

means, in response to an operating signal, for causing said selecting means to select said second control signal for causing acceleration of said motor from zero speed to a predetermined transfer speed less than said standard speed and for thereafter selecting said first control signal for continuing the acceleration of said motor to said standard speed in response to output values of said integration means; and means for loading the stored optimum integration value into said integration means and for causing the output value of said integration means to be said optimum integration value when said first control signal is selected in response to said motor reaching said predetermined speed.

5. A carriage control device according to claim 4, wherein the predetermined transfer speed reached under control of the second control signal is achieved as a result of accelerating said carriage motor at a maximum acceleration obtainable by said motor driving means.

6. A carriage control device according to claim 4, wherein said second control signal is of a constant value for controlling the acceleration of said motor from zero speed to said transfer speed.

* * * * *